March 6, 1945. W. M. ZAIKOWSKY 2,370,703
SYSTEM FOR GAS ANALYSIS
Filed Aug. 2, 1940 3 Sheets-Sheet 1
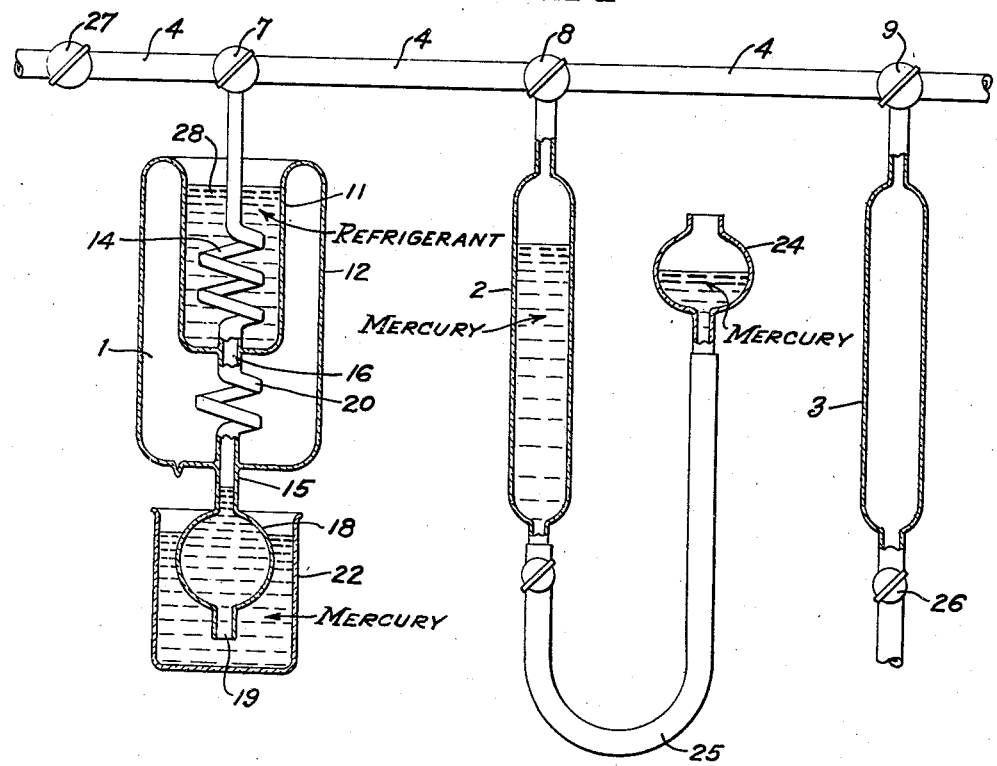
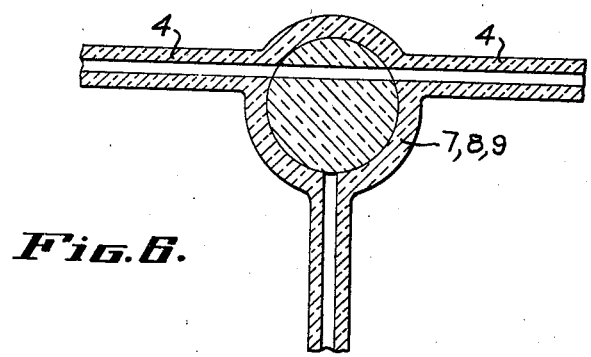
INVENTOR.
WLADIMIR M. ZAIKOWSKY
BY
Reed C Lawlor
AGENT.

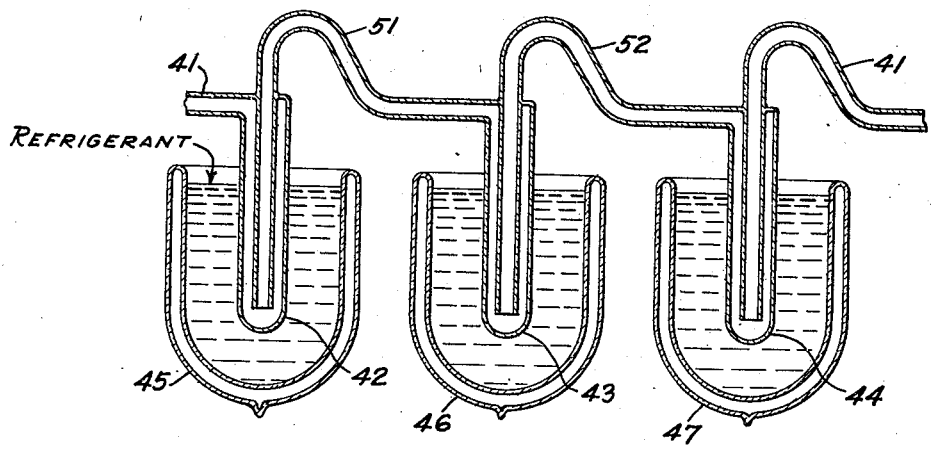
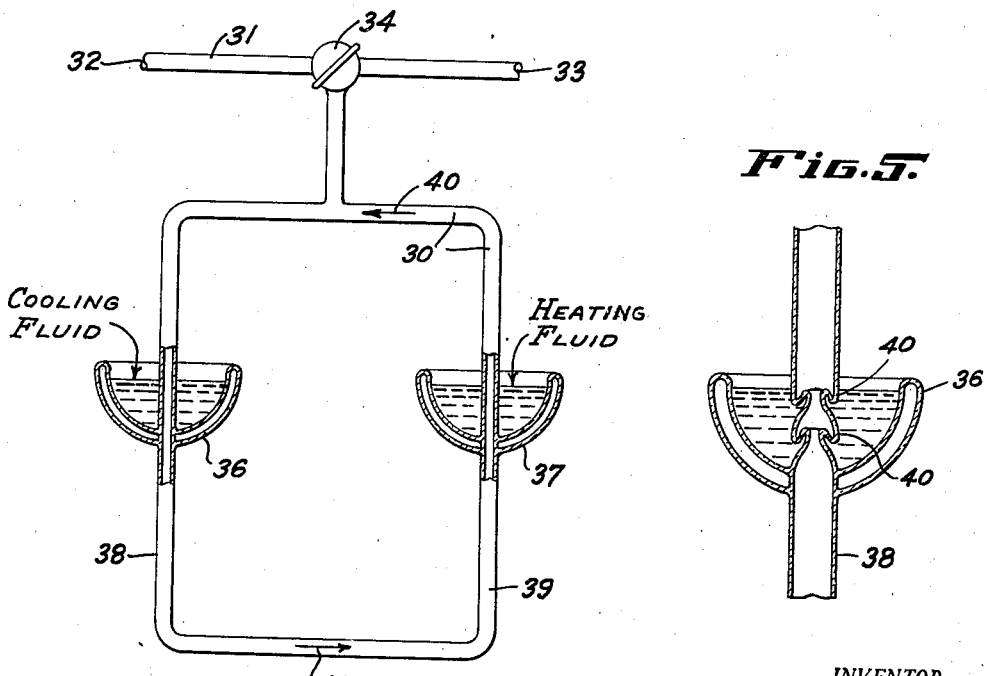
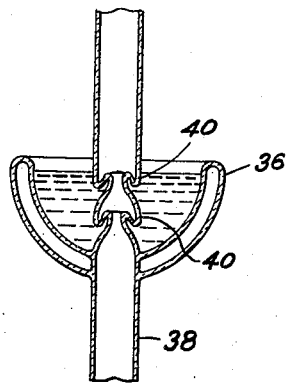

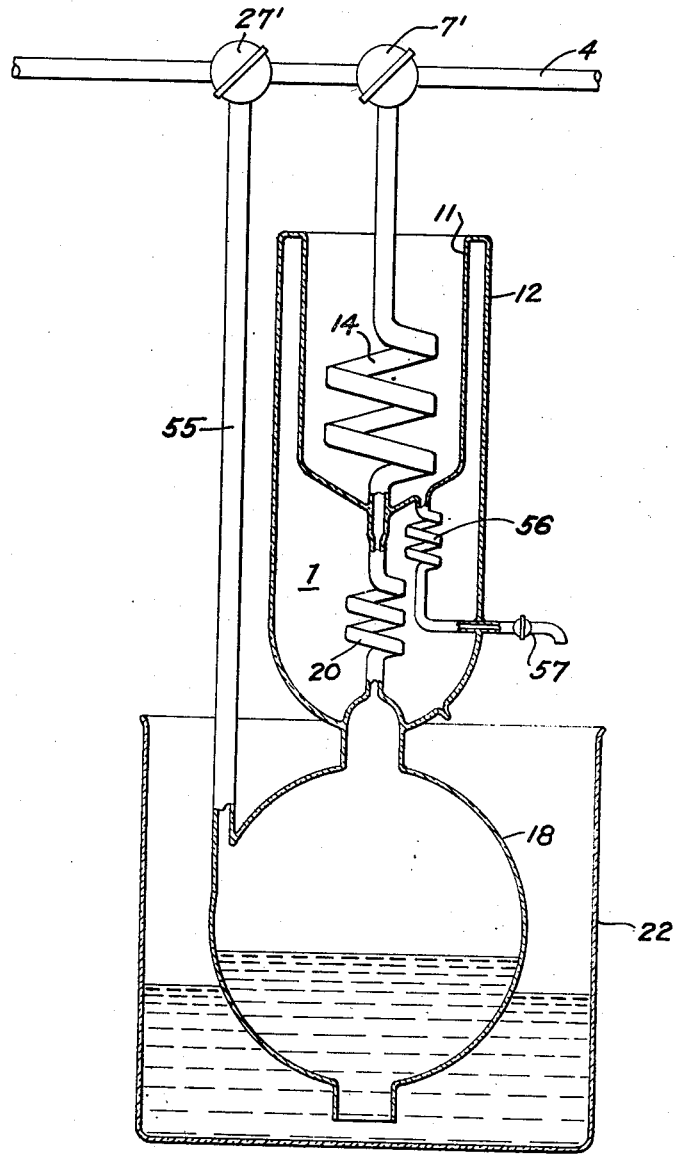

Patented Mar. 6, 1945

2,370,703

UNITED STATES PATENT OFFICE 2,370,703

SYSTEM FOR GAS ANALYSIS

Wladimir M. Zaikowsky, Pasadena, Calif., assignor, by mesne assignments, to Consolidated Engineering Corporation, Pasadena, Calif., a corporation of California Application August 2, 1940, Serial No. 350,040

4 Claims. (Cl. 62—175)

This invention relates to the field of chemical analysis and more specifically to the field of gas analysis in which temperature fractionation is used to separate components of a gaseous mixture under investigation.

An object of this invention is to provide a method and apparatus for effecting substantially complete separation of the components of a gaseous mixture.

A more specific object is to separate the components of gaseous mixtures by stages, the residue of the gas or gases from a preceding stage being partially removed in a succeeding stage or stages.

It is also an object to separate components from a gaseous mixture by freezing and collecting portions of such components in each of successive stages.

A further object is to effect separation by successive stages of desired components of a gaseous mixture by freezing out certain components in the respective stages and revaporizing any residue of the gas passing in solid or liquid form past the region where freezing occurs.

Another object is to provide a freezer which is particularly adapted to separating a particular constituent from a gas mixture in a very pure state.

Another object is to automatically effect complete separation between components of a gaseous mixture.

Another object is to provide a method for separating carbon dioxide in a relatively pure state from a gas mixture also containing ethane and ethylene.

Another object is to provide a method for separating components of a hydrocarbon gas mixture.

It is to be understood of course that either the condensed gases or the gases remaining in gaseous form, or both, may contain the desired components to be detected and measured depending on the particular analytical problem at hand.

My invention possesses numerous other objects and features of advantage, some of which, together with the foregoing, will be set forth in the following description of specific apparatus embodying and utilizing my novel method. It is therefore, to be understood that my method is applicable to other apparatus, and that I do not limit myself, in any way, to the apparatus of the present application, as I may adopt various other apparatus embodiments, utilizing the method, within the scope of the appended claims.

My invention may be more readily understood from the following description taken in conjunction with the drawings in which:

Fig. 1 is an illustration of one form of my freezer together with auxiliary apparatus.

Fig. 2 represents a second form of apparatus in which thermo-syphon action is utilized in automatically separating gaseous components of a mixture.

Fig. 3 represents a third embodiment of my invention utilizing a succession of U-tubes maintained at a freezing temperature.

Fig. 4 represents a variation of the freezer of Fig. 1 which incorporates the thermo-syphon feature of Fig. 2.

Fig. 5 showing a variation of the apparatus of Fig. 2 includes condensation lobes for the collection of liquid as well as solid condensate.

Fig. 6 is a sectional view of a preferred form of three-way stopcock used in my system.

In Fig. 1, illustrating one form of apparatus useful in performing the method of my invention, are shown a freezing chamber 1, a pumping burette 2, and a collector burette 3, which are respectively, connected to a distributor line 4 by means of three-way stopcocks 7, 8, and 9, preferably of the type shown and claimed in my Patent No. 2,000,552, and shown in section in Fig. 6.

The freezing chamber 1, comprises an evacuated Dewar flask having an inner wall 11 and an outer wall 12 concentric therewith. At the bottom of outer wall 12 is a neck 15, communicating with bulb 18 having an opening 19 at the bottom thereof. Said Dewar flask 1 is preferably made transparent to permit visual observation of accumulations of components on the inside of capillary 14. Mounted within the vessel formed by inner wall 11 is a spiral capillary tube 14, the upper end of which is connected to distributor line 4 through stopcock 7 and the lower end of which is sealed around aperture 16 at the lowermost point of inner wall 11.

A thin wall spiral tubing 20 having about the same inside diameter as capillary tube 14 is connected between the aperture 16 and the neck 15 in such a manner as to form a continuous passage from the uppermost portion of capillary 14 to bulb 18. Capillary 20 is preferably made of very flexible glass tubing to provide sufficient flexibility to prevent breakage when parts of the chamber contract upon the addition of a freezing mixture in the space between inner wall 11 and capillary 14.

Bulb 18 is surrounded by a beaker 22 which contains a quantity of inert fluid such as mercury.

The lower end of burette 2 communicates with a vessel 24 through flexible tubing 25. Vessel 24 also contains an inert fluid, such as mercury, and preferably has a greater volume than burette 2. Vessel 24 may be raised and lowered vertically to vary the volume of gas contained in burette 2 in accordance with the vertical height of mercury in said burette.

The amplitude of vertical movement of vessel 24 should exceed the length of a mercury column at atmospheric pressure. The excess length should preferably be greater than the vertical length of burette 2 in order to make possible complete and rapid pumping of gas from capillary 14 to collector 3 using stopcock 8 as a valve of a vacuum pump.

The collector burette 3 has at the bottom end thereof a second stopcock 26.

In operation the above described apparatus is used as follows:

The space within bulb 18, spiral tube 20, and tube 14 is first filled with mercury, all the way up to the distributor line 4.

This may be accomplished, for example, by lifting vessel 24 to its uppermost position thereby filling burette 2 with mercury up to the level of the distribution line 4, then setting stopcocks 7, 8, and 9 to close off burette 2 from the line 4 and provide communication between burette 3 and the freezer 1.

The distributor line 4 and burette 3 are then evacuated by means of a vacuum system connected to burette 3 through stopcock 26. When a sufficiently low pressure has been reached, mercury will fill capillary 14 up to the level of the distributing line. Stopcock 7 is then turned to close off the freezer from the distributor line and the portion of the distributor line between stopcocks 7 and 8 is completely evacuated.

Gases may also be completely removed from the section of distributor line between stopcock 7 and 8 by displacement with mercury.

After capillary 14, distributor line 4, pumping burette 2, and collection burette 3 have been freed of gases, a sample of gas to be analyzed is admitted to the freezer through stopcocks 27 and 7 and allowed to fill capillary 14 and a desired fraction of bulb 18 by displacing the mercury therein.

After the sample has been introduced to bulb 18, stopcocks 7 and 8 are turned to establish communication between bulb 18 and burette 2.

The vessel provided between inner wall 11 and capillary 14 is then filled with a refrigerant having a predetermined temperature so that any predetermined gases may be frozen out of the sample. For example, fresh liquid air, or preferably liquid nitrogen, may be used to separate carbon monoxide, hydrogen and methane from low concentrations of ethane, ethylene, propane, butane, or any other gaseous constituent which has an insignificant vapor pressure at the temperature of said refrigerant. After removal of said gaseous constituents by pumping, liquid oxygen may be substituted for the fresh liquid air or nitrogen, and ethane and ethylene can be reevaporated and separated by pumping from other components having insignificant pressures at the temperature of liquid oxygen.

After the sample has been introduced into the bulb and a suitable freezing mixture added to the flask, and communication established between freezer 1 and burette 2, vessel 24 is gradually lowered, thereby producing a lowering of the mercury level in burette 2 and drawing the gas sample from bulb 18 upward through spirals 20 and 14 of freezer 1 and into the burette 2. This process is continued until the mercury contained in beaker 22 is drawn up to as high a point as possible below aperture 15 where the mercury will not freeze. In this manner practically all of the gas sample is slowly drawn through capillary 14, thereby being subjected to the freezing action of the freezing mixture contained in freezing chamber 1.

Though a large fraction of the condensible components collects on the inner wall of capillary 14, some of the condensible components fail to be fixedly retained on the wall and are blown past the freezing zone by the moving gas and thereupon vaporize and enter burette 2.

Where minute quantities of condensate are to be determined or other accurate measurements are required, the above condensation technique is not sufficiently complete because some of the condensible components are drawn into burette 2 instead of being frozen onto the wall of spiral 14. Accordingly, I then raise vessel 24 increasing the height of the mercury level in burette 2 and forcing the gas back into bulb 18 and subjecting the gas to the action of the freezer for a second time. I repeat the above described freezing process a number of times, thus repeatedly subjecting the gas to the freezing process and between freezing steps revaporizing any condensate carried past the prior freezing step, thus obtaining a more and more complete separation between the condensible and non-condensible components. By making about five such passes, I am able to produce substantially complete separation of the condensible and uncondensible components so that I am able to make very accurate analysis of the sample.

When the sample is being drawn into burette 2 for the last time, the mercury of vessel 22 is sucked up through the thin wall spiral 20 to such a point conveniently below capillary 14 where the mercury freezes, forming an airtight greaseless seal.

One way to transfer the gaseous components to collector burette 3 is to gradually turn stopcock 8 to a position such that capillary 14 communicates with evacuated burette 3 and simultaneously closes off burette 2 from the distributor line. By thus turning stopcock 8 gradually practically all of the residual gas contained in capillary 14 is drawn into collector burette 3 without a sudden rush of gas rupturing the frozen deposit in capillary 14.

Stopcock 8 is then turned to a position which provides communication between burettes 2 and 3 and shuts off freezer 1 from said burettes, and the mercury level is then raised within burette 2 to transfer the incondensible components into the collector burette 3. If desired, stopcock 8 may then be turned to establish communication between capillary 14 and burette 2 and the mercury lowered to exhaust non-condensible gases from said capillary. Stopcock 8 may be turned to establish communication between the burettes and the gas in burette 2 pumped into burette 3 by raising the mercury level in burette 2 and even filling the distributor line between stopcocks 8 and 9 with mercury if desired.

An alternate method of transferring the gaseous components to burette 3 is to first transfer gas from burette 2 to burette 3 and then to slowly pump residual gases from capillary 14 to said burette 3. This procedure is also suitable to preclude rupturing of the frozen deposits.

By following the process above described the sample becomes completely separated into two characteristic fractions depending on the temperature of the freezing mixture utilized. The condensate may be obtained in gaseous form by removing the freezing liquid from freezer 1 and then the condensate may be transferred to any desired analytical apparatus by any well known method. Either portion of the sample may be subjected to further analysis in accordance with the particular requirements of the problem at hand.

In Fig. 2 I have illustrated a second apparatus embodiment of my invention in which provision is made for automatically separating components of a gas sample under investigation. A chamber consisting of a tube 30 providing a closed circuitous path is connected to a distributor line 31 having an inlet 32 and an outlet 33. A three-way stopcock 34 preferably of the type described and claimed in my Patent No. 2,000,552 is utilized to connect chamber 30 with either the inlet or the outlet.

The tube comprising chamber 30 is preferably mounted in a vertical plane and has two cups 36 and 37 placed around the two vertical legs 38 and 39 respectively. A freezing mixture is introduced into cup 36 and a heating fluid introduced into cup 37.

Accordingly, when gas is introduced into the chamber 30, it is cooled in leg 38 and warmed in leg 39. As a result of the combined actions of gravity and the differential temperatures in the gases in the two legs, the gas will circulate in chamber 30 in the direction indicated by the arrows 40—40. Such circulation is known as thermosyphon action and will in general occur as long as there is either a cooling or a freezing zone having vertical extremities of different gravitational potentials.

Constituents having condensation temperatures above the temperature of the freezing mixture within cup 36 will gradually accumulate as solid or liquid as the case may be on the wall of leg 38. Due to the continuous automatic circulation of the gas in chamber 30 and the repeated cooling and heating of every portion of the gas very efficient separation of the condensible and noncondensible components is obtained. Portions of condensed components carried past the freezing zone are revaporized in the heating zone.

It is clear, of course, that in this embodiment of my invention, cup 37 containing a heating fluid is not necessary if the temperature of the space in which the chamber is contained is maintained warm enough to revaporize condensed constituents which are carried past the bottom of the cup 36 by the moving gas.

After the circulation process has continued for a predetermined time, the remaining gases contained in chamber 30 may be withdrawn therefrom by exhausting through line 33. Subsequently the freezing liquid may be removed and the condensed components withdrawn.

By appropriately dimensioning the apparatus, laminar flow may be maintained resulting in efficient, rapid and complete separation of components.

When it is desired to collect condensed liquids in the condensation zone associated with a freezing mixture in vessel 36, condensation lobes 40 are preferably included within said freezing zone as illustrated in Fig. 5.

Fig. 3, showing a third embodiment of my invention, comprises a flow line 41 containing a series of traps 42, 43, and 44 immersed in a freezing medium contained in vacuum bottles 45, 46, and 47 respectively. In this particular embodiment of my invention, a gas mixture is passed through a flow line 41 from one end to the other through the freezing stages where portions of the condensible components to be removed are solidified or liquefied as the case may be. Any portions of the condensed constituents which are blown past the freezing stages are revaporized in revaporizing stages 51 and 52. Heat may be applied to said revaporizing stages for this purpose in any suitable manner.

Fig. 4 illustrates an embodiment of my invention incorporating the thermo-syphon feature of Fig. 2 in a freezer similar to that hereinabove described in connection with Fig. 1. In this embodiment an auxiliary tube 55 connects bulb 18 with distributor line 4 through a three-way stopcock 27'. After a sample has been introduced to bulb 18, stopcocks 7' and 27' are turned to such positions as will provide a closed circuitous path through tube 55, bulb 18, capillary 14 and the portion of the distributor line between said two stopcocks 7' and 27'. Accordingly when a freezing mixture is introduced into the space between wall 11 and capillary 14, thermo-syphon action produces a circulation of the gas mixture around said circuitous path thus repeatedly exposing said gas to freezing temperatures for condensing any particular component to be removed from the gas mixture. Any condensed constituents flowing past the freezing region are revaporized and recirculated to the freezing region where they are again subjected to the action of the freezer.

In Fig. 4 I have also illustrated one particular device which is suitable for removing the freezing mixture from the space around capillary 14 when desired. Said device comprises a thin capillary 56 providing a discharge outlet for the freezing mixture. Said discharge outlet may be controlled by means of a stopcock or valve 57.

Of all the several apparatus embodiments of my invention here illustrated, that represented in Fig. 4 is the most useful and most satisfactory. Not only does it provide for separating out desired gaseous constituents from a mixture as do all the embodiments represented in the other figures, but like the embodiments of Figs. 1 and 2, it provides a simple way of removing either the condensed or noncondensed constituents and also makes possible practically complete removal of condensible gases adsorbed on the walls of the glass outside the freezing zone by providing for repeatedly exposing said walls to gas from which condensate has been removed. In addition, the apparatus of Fig. 4 is the most flexible to operate because of the numerous ways it can be manipulated. Thus, for instance, with this apparatus gas can be passed through the freezing zone any desired number of times, or may be circulated automatically if desired. The apparatus of Fig. 4 is also very efficient in operation because of the relatively large length of tubing in the freezing zone.

From the description of my invention hereinabove given it is clear that my process is well adapted to making accurate gas analysis, especially where complete removal of any gas constituent existing in low concentration is prerequisite to such accuracy. Obviously either the gaseous or the condensed fraction obtained by my method may be analyzed for their respective constituents in accordance with the demand of the particular problem at hand.

My invention is particularly useful, for example, in the study of combustion processes wherein accurate determinations of carbon dioxide are required.

When the last trace of $CO_2$ is to be removed from a mixture containing also small amounts of ethane and/or ethylene, I use liquid oxygen in preference to liquid air as the vapor pressures of ethane and ethylene are about twenty times as great at the temperature (about −183° C.) of liquid oxygen as at the temperature (−194° C.) of fresh liquid air. Since the maximum amount of residual ethane and/or ethylene remaining in the vapor phase depends on the vapor pressure at the freezing out temperature, I am able to maintain larger quantities of such hydrocarbons in the vapor phase by freezing out carbon dioxide at the temperature of liquid oxygen than when I use liquid air for this purpose. Provision may be made for retaining still larger quantities of ethane and/or ethylene in vapor phase by maintaining the liquid air at reduced pressure thus raising its boiling point. Thus I can freeze out the last traces of carbon dioxide at liquid oxygen temperature without substantial loss of ethane and ethylene up to a predetermined limit.

Thus my process is particularly useful in the analysis of soil gas mixtures for hydrocarbons indicative of oil deposits underlying the points of the earth from which said mixtures are obtained. After the last traces of free carbon dioxide have been removed from said mixtures in accordance with my method, said mixtures may then be subjected to combustion analysis for determination of the quantities of such hydrocarbons as methene, ethane, and/or ethylene. When a combustion technique is used to determine minute quantities of such hydrocarbons, the carbon dioxide resulting from such combustion process may then be completely recovered in solid form by the process hereinabove described and then measured by any method known to those skilled in the art.

I claim:

1. In apparatus for removing a gaseous component from a gaseous mixture comprising a closed circuitous conduit, first means in one portion of said conduit for collecting said component in a non-gaseous phase, second means in another portion of said conduit for revaporizing parts of said component which fail to be collected in said means, both of said aforementioned means cooperating to maintain circulation of a gas in said conduit.

2. In apparatus for gas analysis, a closed circuitous conduit positioned to have some vertically disposed portions along the length of said conduit, first means for condensing a gas component onto the walls of one zone of said conduit and means for heating a gas in a second zone of said conduit to revaporize any condensed constituent passing through said first zone into said second zone, at least one of said means being mounted in one of said vertically disposed portions.

3. Apparatus for removing a gaseous component from a gaseous mixture, comprising a closed circuitous path having at least two non-horizontal portions, first means for condensing a gas component onto the walls of one zone of said conduit, and means for heating a gas in a second zone of said conduit to revaporize any condensed constituent passing through said first zone into said second zone, at least one of said zones being in one of said two non-horizontal portions to maintain thermo-syphon circulation in said conduit.

4. The method of removing a component from a gaseous mixture in the analysis of said mixture comprising the steps of continuously circulating by thermo-siphon action said mixture in a closed circuitous path, while maintaining one portion of said path at a temperature at which the vapor pressure of said component is reduced to a low value by conversion of said component to a non-gaseous phase, and while maintaining another portion of said path at a temperature at which any non-gaseous residue which is carried past the first portion is revaporized.

WLADIMIR M. ZAIKOWSKY.